Feb. 10, 1948. H. A. JOHNSON 2,435,836
CENTRIFUGAL COMPRESSOR
Original Filed Dec. 13, 1944
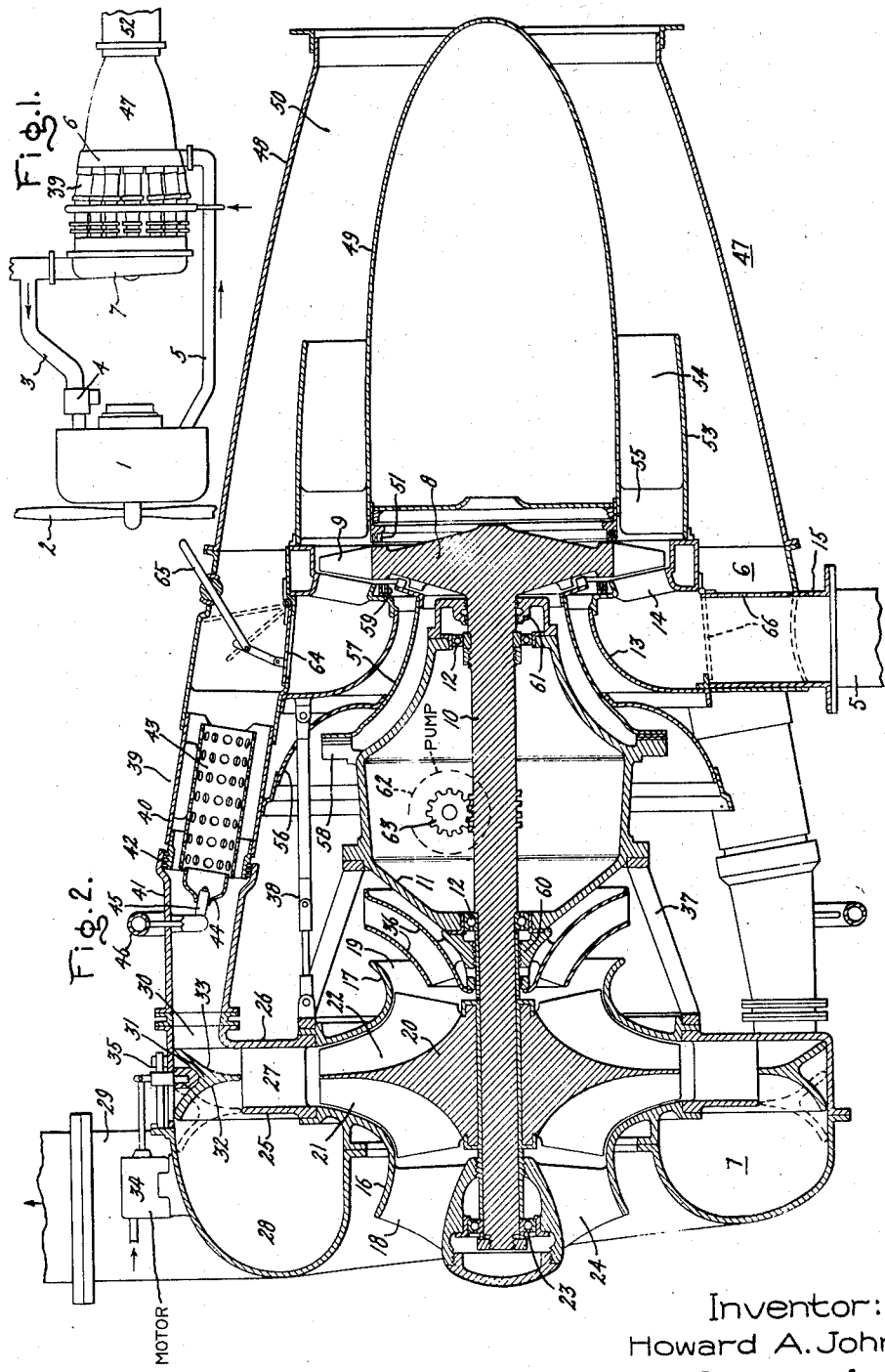
Inventor:
Howard A. Johnson,
by Powell P. Mack
His Attorney.

Patented Feb. 10, 1948

2,435,836

UNITED STATES PATENT OFFICE 2,435,836

CENTRIFUGAL COMPRESSOR

Howard A. Johnson, Melrose, Mass., assignor to General Electric Company, a corporation of New York Original application December 13, 1944, Serial No. 567,993. Divided and this application May 1, 1946, Serial No. 666,318

3 Claims. (Cl. 230—114)

The present invention relates to aircraft power-plants including a turbosupercharger for supercharging an internal combustion engine to operate a propeller and for supplying compressed air to a combustion chamber or gas generator for producing gases to operate such aircraft by jet propulsion.

This application is a division of my earlier application, Serial No. 567,993, filed December 13, 1944.

An object of my invention is to provide an improved aircraft powerplant for propelling an aircraft by propeller and jet propulsion. Another object of my invention is to provide an improved turbosupercharger arrangement for furnishing compressed air to various consumers on an aircraft. A further object is to provide an improved centrifugal compressor especially adapted for use in gas turbine powerplants.

For a consideration of other objects and of what I consider novel and my invention, attention is directed to the following description and the claims appended thereto in connection with the accompanying drawing.

In the drawing, Fig. 1 illustrates an aircraft powerplant according to my invention; and Fig. 2 is an enlarged view of a part of Fig. 1.

The powerplant shown comprises a combustion engine 1 arranged to drive a propeller 2 for propelling the aircraft. The engine has an inlet manifold connected to a supply conduit 3 for compressed air in series with a carburetor 4 and an exhaust manifold connected to an exhaust conduit 5. The engine 1 is supercharged by means of a turbosupercharger which has an exhaust gas operated turbine 6 connected to the exhaust conduit 5 and normally operated by exhaust gases of the engine. The turbine drives a compressor 7 for supplying compressed air to the inlet conduit 3 of the engine 1.

The arrangement so far described is known and typical of turbosupercharged internal combustion engines. According to my invention a special turbosupercharger is provided which includes a compressor arranged to furnish air to supercharge the internal combustion engine as well as to maintain combustion in a combustion chamber or chambers for operating a jet propelling device. In addition, the plant according to my invention includes means with a special compressor arrangement whereby either the jet propelling device or the propeller propelling combustion engine may be operated alone. The turbine, as shown more in detail in Fig. 2, comprises a bucket wheel 8 having a disk with a row of buckets 9 attached to its rim and integrally formed with an overhung portion of a shaft 10 supported on a casing 11 by means of bearings 12. Operating gases are conducted to the bucket wheel 9 by means including a nozzle box 13 concentrically spaced from the right-hand end of the casing 11 and having an annular row of nozzle partitions 14 for directing gases toward the buckets 9. The box 13 has a flanged inlet 15 connected to the aforementioned exhaust conduit 5 of the engine 1.

The centrifugal compressor 7 comprises a casing having two halves 16, 17 forming an impeller chamber with two axial inlets or eyes 18 and 19 respectively. A dual impeller is disposed in the impeller chamber and has a disk 20 secured to the shaft 10 and provided with circumferentially spaced blades 21 and 22 on opposite sides. The impeller blades 21 form passages for receiving air or like medium through the inlet 18, and the impeller blades 22 form passages for receiving air to be compressed through the inlet 19. The left-hand end of the shaft 10 is additionally supported by a bearing 23 having a housing held on guide vanes 24 in the inlet 18 of the casing half 16. Air discharged from the impeller during operation is passed through a diffuser to convert part of the velocity energy of the air into pressure energy. The diffuser comprises axially spaced walls 25 and 26 secured to the casing halves 16 and 17 respectively and circumferentially spaced vanes 27 forming diffuser passages with the walls 25, 26. During operation, a part of the air discharged from the diffuser is passed into a scroll 28 which has a flanged outlet 29 connected to the aforementioned conduit 3 to furnish compressed air for operating the combustion engine 1. Another part of the compressed air discharged from the diffuser passes into flanged outlets or chambers 30 which are connected to gas generators or combustion chambers, as will be described more fully hereafter.

According to my invention means are provided for smoothly deflecting compressed air into the scroll 28 and into the outlets 30 and also for varying the relative amounts of air or the ratio of flow conducted to the scroll 28 and into the outlets 30. This means in the present example comprises a ring member or deflector 31 which has deflecting surfaces 32 and 33. Normally the ring member 31 is held in an intermediate position as shown in full lines in the drawing to deflect part of the compressed air or medium into the scroll and another part into the outlets 30. The ring member 31 is axially guided on the outer wall of the compressor and may be moved and positioned axially by means including a motor 34 connected to a positioning member 35. Broadly, the deflector 31 constitutes an axially adjustable wall common to separate chambers on opposite sides of the compressor. When moved into its left-hand end position, as indicated in dotted lines, the ring member 31 disconnects completely the scroll 28 from the diffuser so that all compressed air is deflected through the outlets 30. A plurality of curved, essentially conical concentric guide channels 36 are located near the inlet 19 of the compressor properly to direct air to be compressed toward the impeller blades 22. The compressor casing is supported on the casing 11 by means of a supporting structure 37 having spaced rings secured to the compressor casing 17 and the casing 11 respectively. In addition the compressor casing and the turbine casing, more particularly the nozzle box 13, are secured together by links or struts 38.

Each outlet 30 of the compressor is connected to a gas generator or combustion chamber 39 having an outer cylindrical wall 40 sealed to the end of a conduit 41 by a suitable packing 42. The conduit 41 is flanged to an outlet 30. An inner, perforated, cylindrical wall 43 is disposed within the wall 40 and closed at its left-hand end by a cup-shaped bottom 44. The bottom 44 and the perforated cylinder 43 constitute the combustion chamber proper. Fuel is supplied thereto by means of a nozzle 45 held in the bottom 44 and connected to a fuel manifold or ring 46. Air is supplied to the combustion chamber from the outlets 30 through the perforations of the cylinder 43. The combustion gases formed in the combustion chambers are supplied to a jet-forming device 47 which latter has an outer wall 48 and an inner wall 49 forming an annular channel 50 between them for receiving gases from the combustion chambers. The inner wall 49 is sealed to the rim of the bucket wheel by a suitable packing 51. The right-hand end of the outer wall 48 has an extension or tail cone 52. The exhaust gases of the turbine are also discharged through the annular channel 50, and to reduce interference between the operation of the gas turbine and combustion chamber an intermediate wall or ring 53 is provided in the inlet part of the annular channel 50 and secured at its left-hand end to the nozzle box 13 to form with the inner wall 49 a channel 54. A plurality of guide vanes 55 are located in the channel 54 to receive exhaust fluid from the turbine wheel and to turn such fluid in rearward direction.

The various combustion chambers are supported on the nozzle box 13 and the casing 11 by means including a ring or partition 56 secured at its inner end to a wall or partition 57 held on lugs 58 on the casing 11. The partition or support 57 and the partition 56 are arranged to reduce heat transfer from the combustion chambers and the nozzle box of the turbine to the casing 11. The inner wall of the nozzle box is sealed to the bucket wheel by a suitable packing 59 to reduce leakage of gases from the nozzle box to the casing 11 and also to preclude leakage of oil or like lubricant from the casing 11 along the shaft 10. Labyrinth packing means 60 and 61 are provided to seal the casing 11 to the shaft 10. Suitable pumping means 62 driven from the shaft 10 through a worm gear 63 are provided to furnish lubricant to the bearings 12 in the casing 11 and 23 in casing 18 and also to supply fuel to the fuel ring 46.

During normal operation, combustion gases from the engine 1 are supplied to the gas turbine acting as an operating medium for the latter. The double impeller of the compressor takes in air through the inlets 18, 19 and forces it through the diffuser 25, 26, 27. Part of this air is passed through the scroll 28 to the engine 1 to supercharge the latter, and another part of the air is supplied through the outlets 30 to the combustion chambers to maintain combustion therein. The combustion gases from said chambers are discharged into a jet-producing device 47 which also receives exhaust gases from the turbine.

The jet-propelling arrangement may be operated during high load requirement, such as during take offs, and at high speed. The ratio of airflow to the engine and to the combustion chambers may readily varied by positioning of the ring member 31 of the compressor. Upon interruption of the oil supply to the manifold 46, the air supplied to the outlet 30 will be bypassed through the combustion chambers to the annular channel 50 where it mixes with the engine exhaust gases and causes further burning and expansion thereof to increase the jet power.

In certain instances, such as upon failure of the combustion engine 1, it may be desirable to operate the aircraft solely by jet propulsion. This may be readily accomplished by my arrangement which includes means for conducting operating gases from the combustion chambers to the gas turbine 6 upon failure of the combustion engine 1, which latter constitutes the normal source of supply for the turbine. To this end some of the channels between the combustion chambers and the annular channel 50 are connected to the nozzle box 13 by means including valves 64 having operating arms 65. In addition, the flanged inlet 15 is provided with a valve 66. During normal engine operation the valve 66 is open to admit exhaust gases from the engine into the nozzle box 13. The valves 64 controlling communication between the combustion chambers and the nozzle box are normally closed, as indicated in full lines in Fig. 2. Upon failure of the engine 1 for driving the propeller 2, the valve 66 is closed to disconnect the nozzle box 13 from the engine 1 and the valve or valves 64 are opened. When fully opened, all of the gases produced by the combustion chambers are passed into the nozzle box and when partially opened, as indicated in dotted lines, part of the gases are conducted to the nozzle box and another part to the channel 50.

What I claim as new and desire to secure by Letters Patent of the United States is:

1. A centrifugal compressor comprising an impeller, a diffuser surrounding the impeller, a discharge scroll located substantially on one side of the diffuser for receiving air from the diffuser, other means located on the other side of the diffuser and also connected to receive air from the diffuser, deflecting means comprising an axially movable ring concentrically surrounding the diffuser for controlling the ratio of flow to the discharge scroll and said other means, and means external of the compressor for positioning said rings.

2. A centrifugal compressor comprising an impeller, a diffuser surrounding the impeller, means forming separate axially spaced discharge chambers connected to the diffuser at opposite sides thereof, said chambers having an annular member therebetween defining a common axially movable deflector wall surrounding the diffuser, and means for axially positioning said annular member to vary the ratio of flow to said chambers.

3. Centrifugal compressor comprising a casing having axially spaced inlets, an impeller with a disk and blades secured to opposite sides of the disk disposed in the casing, a diffuser surrounding the impeller, a discharge scroll located substantially on one side of the diffuser for receiving part of the fluid flow therethrough, and means forming a plurality of circumferentially spaced outlets on the other side of the diffuser, a deflector concentrically surrounding the diffuser for directing fluid into the discharge scroll and said outlets respectively, and means for axially positioning the deflector to vary the ratio of flow into the scroll and the outlets.

HOWARD A. JOHNSON.

REFERENCES CITED

The following references are of record in the file of this patent:

UNITED STATES PATENTS

| Number | Name | Date |
| --- | --- | --- |
| 1,261,807 | Greenawalt | Apr. 9, 1918 |
| 1,550,710 | Schmidt | Aug. 25, 1925 |
| 2,205,902 | McMahan | June 25, 1940 |